United States Patent
Owechko et al.

(10) Patent No.: US 7,133,699 B1
(45) Date of Patent: Nov. 7, 2006

(54) SYSTEM AND METHOD FOR SEPARATING SIGNALS RECEIVED BY AN OVERLOADED ANTENNA ARRAY

(75) Inventors: Yuri Owechko, Newbury Park, CA (US); David B. Shu, West Hills, CA (US)

(73) Assignee: Raytheon Company, Waltham, MA (US)

(*) Notice: Subject to any disclaimer, the term of this patent is extended or adjusted under 35 U.S.C. 154(b) by 514 days.

(21) Appl. No.: 10/421,167

(22) Filed: Apr. 22, 2003

(51) Int. Cl.
*H04M 1/00* (2006.01)

(52) U.S. Cl. .............................. 455/562.1; 455/67.11; 704/203

(58) Field of Classification Search ............ 455/67.11, 455/67.13, 67.15, 562.1; 704/203, 205, 206
See application file for complete search history.

(56) References Cited

U.S. PATENT DOCUMENTS

| 6,236,862 B1 | 5/2001 | Erten et al. | 455/501 |
| 6,424,960 B1 | 7/2002 | Lee et al. | 706/20 |
| 2003/0061035 A1* | 3/2003 | Kadambe | 704/203 |

FOREIGN PATENT DOCUMENTS

WO  WO 01/89167  11/2001

OTHER PUBLICATIONS

Notification of Transmittal of the International Search Report or the Declaration (PCT Rule 44.1) mailed Sep. 29, 2004 (13 pages) re International Application No. PCT/US2004/008948.
Lloyd J. Mason, "Detection of Digital Signals with Antenna Arrays Using Estimation," 1994 Canadian Conference on Electrical and Computer Engineering, Conference Proceedings, (CAT. No. 94TH8023), IEEE New York, New York, vol. 1, pp. 380-383, XP00229623, ISBN: 0-7803-2416-1, Sep. 25, 1994.

* cited by examiner

*Primary Examiner*—Lee Nguyen
(74) *Attorney, Agent, or Firm*—Baker Botts L.L.P.

(57) ABSTRACT

A method of separating mixed wireless signals is provided. The method includes receiving, at an antenna comprising a first quantity of antenna elements, mixed signals comprising a mixture of source signals communicated from a second quantity of wireless signal sources, and separating the mixed signals to estimate the source signals. The second quantity is greater than the first quantity, and the source signals communicated from at least one of the wireless signal sources are received at the antenna as complex signals.

11 Claims, 5 Drawing Sheets

SYSTEM AND METHOD FOR SEPARATING SIGNALS RECEIVED BY AN OVERLOADED ANTENNA ARRAY

TECHNICAL FIELD OF THE INVENTION

This invention relates in general to processing wireless signals received by antennas and, more particularly, to a system and method for separating signals received by an overloaded antenna array.

BACKGROUND OF THE INVENTION

The separation of mixed signals is a common problem in wireless communications, particularly in urban environments in which many signal sources (such as mobile phones and personal digital assistants, for example) are transmitting and receiving wireless communications. Often the number of signal sources exceeds the number of sensors, or antenna elements, which receive the wireless signals from such signal sources. This is commonly referred to as an overloaded case, or an overloaded antenna array. Current techniques which attempt to separate mixed signals in an overloaded case are limited in that they cannot deal well with complex signals, such as multi-path signals, for example. In addition, such techniques are useful only with very small antenna arrays, such as arrays consisting of two elements. Further, antenna arrays often must be calibrated and/or have prior knowledge of the particular wireless signals within the relevant wireless environment.

Thus, there is a need for systems and methods that can separate mixed complex signals into the individual componenet source signals in an overloaded case and for larger antenna arrays. In addition, it would be advantageous for such systems and methods to act in a "blind" manner—in other words, without having prior knowledge of the wireless signals within the relevant wireless environment.

SUMMARY OF THE INVENTION

In accordance with the present invention, systems and methods for separating signals received by overloaded antenna arrays. According to one embodiment, a method of separating mixed wireless signals is provided. The method includes receiving, at an antenna comprising a first quantity of antenna elements, mixed signals comprising a mixture of source signals communicated from a second quantity of wireless signal sources, and separating the mixed signals to estimate the source signals. The second quantity is greater than the first quantity, and the source signals communicated from at least one of the wireless signal sources are received at the antenna as complex signals.

According to another embodiment, a system for separating mixed wireless signals is provided. The system includes an antenna and a signal processing system. The antenna includes a first quantity of antenna elements. Each antenna element is operable to receive mixed signals comprising a mixture of source signals communicated from a second quantity of wireless signal sources. The signal processing system is operable to separate the mixed signals to estimate the source signals. The second quantity is greater than the first quantity, and the source signals communicated from at least one of the wireless signal sources are received at the antenna as complex signals.

Various embodiments of the present invention may benefit from numerous advantages. It should be noted that one or more embodiments may benefit from some, none, or all of the advantages discussed below.

One advantage of the invention is that blind source separation of source signals may be achieved in an overloaded case (in other words, in a situation in which an antenna receives signals from more sources than the antenna has elements). Decoupling the estimation of mixing matrix A from the estimation of the sources S yields better results than existing approaches which attempt to solve both problems at the same time.

Another advantage of the invention is that complex signals, such as multi-path signals received by an antenna may be separation, including in an overloaded case. Such separation of multi-path signals is often important in urban environments in which signals often reflect one or more times before being received by the antenna.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 6 of the drawings, in which like numerals refer to like parts.

Figure 1:
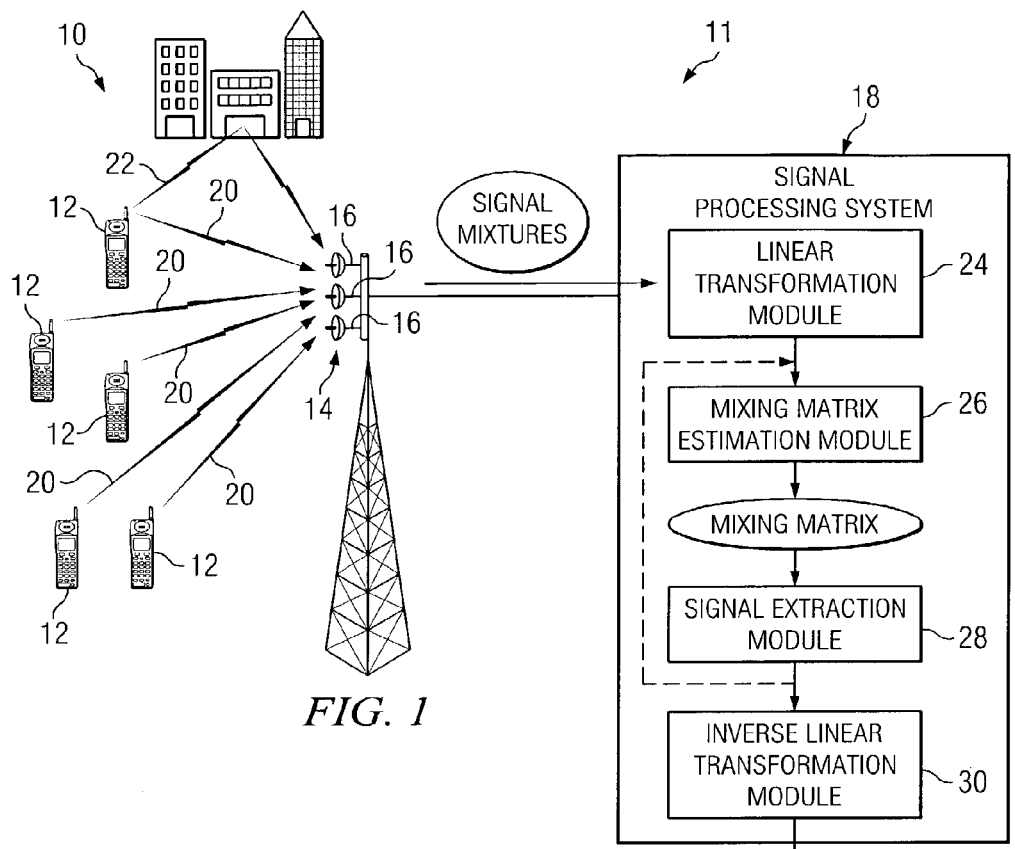
FIG. 1 illustrates a wireless communication system in accordance with an embodiment of the present invention.

FIG. 1 illustrates a wireless communication system 10 in accordance with an embodiment of the present invention. Communication system 10 includes an antenna system 11 and a plurality of wireless signal sources 12. Antenna system 11 includes an array 14 of antenna elements 16 and a signal processing system 18. Antenna elements 16 of array 14 may be physically spaced apart in a particular pattern. For example, elements 16 may be spaced apart at equal distances. Each antenna element 16 may be operable to receive signals from and/or transmit signals to wireless signal sources 12. Signal processing system 18 may be operable to process signals received from wireless signal sources 12, which may be referred to as source signals.

Antenna system 11 may be a smart antenna system in which array 14 and signal processing system 18 cooperate to receive and/or transmit signals in a spatially sensitive manner. For example, antenna system 11 may be operable to determine the direction of arrival of uplink signals communicated from each wireless signal source 12 and select particular directions in which to transmit downlink signals to the wireless signal sources 12 accordingly.

Each antenna element 16 may receive a mixed signal that includes some combination of each source signal (in other words, a combination of the signals communicated from each signal sources 12). An antenna element 16 may receive a source signal from a particular signal source 12 as a composite, or complex, signal due to the effects of inter-symbol interference, such as the multi-path effect. For example, as shown in FIG. 1, each antenna element 16 may receive a complex signal from signal source 12a that includes signals received along direct path 20 as well as signals received along reflected path 22.

Signal processing system 18 is operable to separate the mixed signals received by antenna elements 16 of array 14 into the source signals communicated by each signal source 12, and to determine, or estimate, the spatial direction of each source signal. In particular embodiments, signal processing system 18 is operable to separate mixed signals which include complex signals received from various signal sources 12 (such as due to multi-path effects, as discussed above). In addition, signal processing system 18 may be operable to separate mixed signals received by antenna elements 16 in situations in which array 14 is overloaded (as well as when array 14 is not overloaded). Array 14 may be said to be overloaded when the number of signal sources, N (in other words, the number of signal sources 12), exceeds the number of antenna elements, M (in other words, the number of antenna elements 16).

As described below in greater detail, signal processing system 18 may be operable to use "sparsity" as an additional constraint for separating mixed signals received by an overloaded array 14. "Sparse" signals comprise signals that have a larger proportion of zero values or low values than would be expected for signals having a Gaussian probability distribution. For example, various types of source signals (such as music and speech signals, and most communication signals, for example) can be assumed to achieve "sparsity" in the transform, or frequency, domain. Source signals may be transformed from the time domain (in which they are received by antenna elements 16) into the transform domain using various transformation algorithms, such as a short-time Fourier transform (STFT) or wavelets transform, for example.

As shown in FIG. 1, signal processing system 18 may include a linear transform module 24, a mixing matrix estimation module 26, a signal extraction module 28, and an inverse linear transform module 30. As discussed below in greater detail, linear transform module 24 is operable to transform received signals from the time domain into the frequency domain. Mixing matrix estimation module 26 is operable to determine, or estimate, the values for a complex [M×N] mixing matrix, and signal extraction module 28 is operable to separate the mixed signals received by array 14 into the various source signals using the estimated complex mixing matrix. For example, mixing matrix estimation module 26 may utilize one or more magnitude clustering and phase-difference algorithms to estimate the complex [M×N] mixing matrix, and signal extraction module 28 may then perform a shortest-path closed-form QR matrix decomposition to estimate the individual source signals. Inverse linear transform module 30 is operable to transform the separated source signals back to the time domain.

Figure 2:
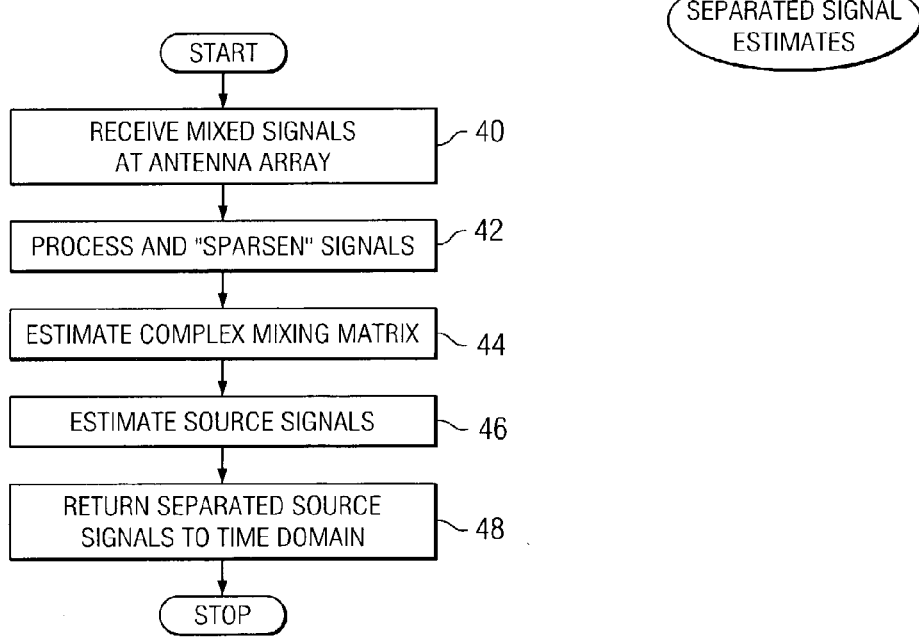
FIG. 2 illustrates a method of separating mixed signals received by an overloaded array into separate estimated source signals in accordance with an embodiment of the present invention.

FIG. 2 illustrates an example method of separating mixed signals received by an overloaded array 14 into separate estimated source signals. At step 40, mixed signals are received from a number (N) of signal sources 12 by an array 14 including a number (M) of antenna elements 16. In the example discussed below, mixed signals including source signals from five signal sources 12 (thus N=5) are received by an array 14 of three antenna elements 16 (thus M=3). As discussed above, the mixed signals received at each antenna element 16 will be some combination of the signals from each signal source 12.

At step 42, the received mixed signals are preprocessed and "sparsened" using linear transforms. The problem of blind source separation (BSS) consists of solving the following equation where both A (the mixing matrix) and S (the source signals) are unknown:

$$X = A * S + V \qquad (1)$$

where:

X is an M×T matrix corresponding to the output of M antenna elements 16 at successive times, t=1, 2, . . . , T. (In other words, row i of X, denoted $X_i$, corresponds to the $i^{th}$ mixture signal);

S is the N×T matrix of underlying source signals;

V is the M×T noise matrix; and

A is the M×N mixing matrix that corresponds to the environment effect in mixing the signals that are received by array 16.

In the noiseless case, a useful formulation of this system is obtained by decomposing A into its columns $a^j$ and particularizing for every data point to provide:

$$x^t = \sum_{j=1}^{N} a^j s_j^t, \text{ for } t = 1, 2, \ldots, T \qquad (2)$$

where $x^t$ is an M-dimensional column vector corresponding to the output of M antenna elements 16 at a given discrete time instant t.

By exploiting the near Laplacian distribution of certain types of signals in the short-time Fourier domain (such as music and speech signals, for example), the $s_j^t$ can be assumed to achieve sparsity, where the term "sparse" refers to the fact that under such a distribution the $l_1$ norm $\Sigma_{jt}|s_j^t|$ of the components is minimized, therefore maximizing the number of source components $(s_1, s_2, \ldots s_n)$ which are zero. Thus, sparsity here refers to the fact that only a small number of coefficients $(s_1, s_2, \ldots s_n)$ in the transform domain differ significantly from zero. Assuming sparsity, Equation (1) may be formulated in mixture space rather than source space, and a maximum a posteriori log-probability analysis leads to the following objective function:

$$\min_{A,S} \frac{1}{2\sigma^2}\|AS - X\|^2 + \Sigma_{jt}|S_j^t| \qquad (3)$$

where $\sigma^2$ represents the variance of the noise V. The first term corresponds to the sum of the squares of the error, and the second term optimizes the sparsity of the recovered sources in the $l_1$ norm sense.

After the mixed signals are preprocessed and "sparsened" as described above, the complex mixing matrix A and the signal sources S are estimated separately, rather than simultaneously. In particular embodiments, this includes estimating complex matrix A using a magnitude clustering and phase-difference algorithm (as described below regarding step 44) and executing a shortest-path closed-form QR enclosing solution to obtain a sparse representation of the sources S (as described below regarding step 46).

At step 44, complex mixing matrix A is estimated using a magnitude clustering and phase-difference algorithm. Step 44 is described in greater detail below with reference to FIG. 3. Generally, magnitude clustering includes creating a scatter plot of data points representing mixed signals received during time duration T and determining from the scatter plot the lines or directions of maximum data density corresponding with each source signal. Phase-difference determination generally includes generating a mixture phase difference histogram for a set of data points associated with each source signal and finding the peak of each histogram.

After the complex mixing matrix A is estimated at step 44, the source signals may be estimated at step 46 using a shortest path algorithm using QR factorization. Step 46 is described in greater detail below with reference to FIGS. 5 and 6. Finally, at step 48, an inverse linear transform function is performed to return the separated source signals to the time domain.

Figure 3:
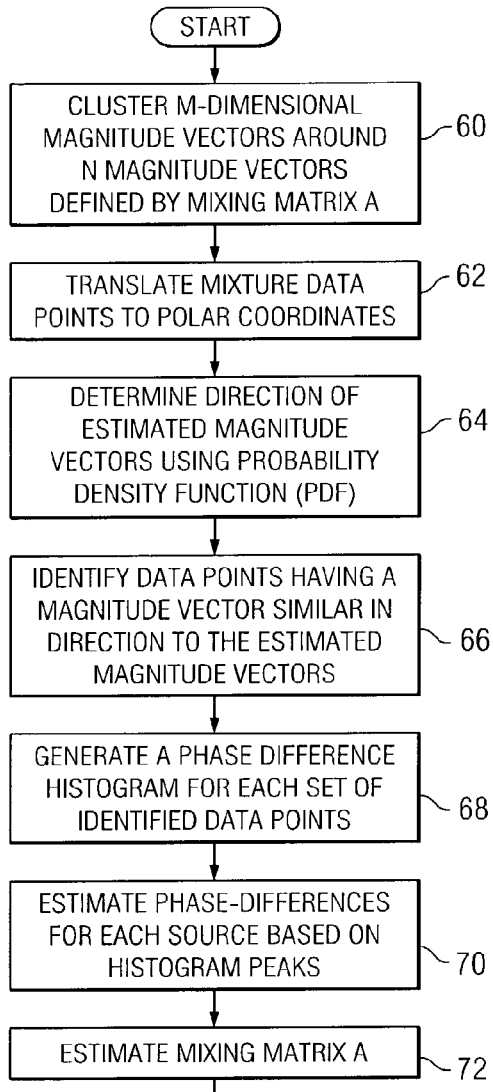
FIG. 3 illustrates an example method of estimating a complex mixing matrix in accordance with an embodiment of the present invention.

FIG. 3 illustrates an example method of estimating complex mixing matrix A as described above regarding step 44 of FIG. 2. As discussed above, the method generally includes determining the lines or direction of maximum data density in the scatter plot of data points representing mixed signals received at each point in time t during a time duration T.

At step 60, a set of M-dimensional magnitude vectors are clustered around the N magnitude vectors defined by mixing matrix A. First, assuming a situation in which N=5 and M=3, X=A*S from Equation (1) may be expanded in the complex domain as follows:

$$\begin{bmatrix} x_1 e^{jw_{x1}} \\ x_2 e^{jw_{x2}} \\ x_3 e^{jw_{x3}} \end{bmatrix} = \qquad (4)$$

$$\begin{bmatrix} a_{11}e^{jw11} & a_{12}e^{jw12} & a_{13}e^{jw13} & a_{14}e^{jw14} & a_{15}e^{jw15} \\ a_{21}e^{jw21} & a_{22}e^{jw22} & a_{23}e^{jw23} & a_{24}e^{jw24} & a_{25}e^{jw25} \\ a_{31}e^{jw31} & a_{32}e^{jw32} & a_{33}e^{jw33} & a_{34}e^{jw34} & a_{35}e^{jw35} \end{bmatrix} \begin{bmatrix} s_1 e^{jws1} \\ s_2 e^{jws2} \\ s_3 e^{jws3} \\ s_4 e^{jws4} \\ s_5 e^{jws5} \end{bmatrix}$$

where:
the left side of the equation represents a particular M-dimensional mixture data point vector;
the set of a factors in each column within matrix A (for example, factors $a_{11}$, $a_{21}$ and $a_{31}$ in the first column) represents the magnitude vector associated with each source ($s_1$ through $s_5$);

j represents the imaginary or complex element; and w represents the phase.

Figure 3A:
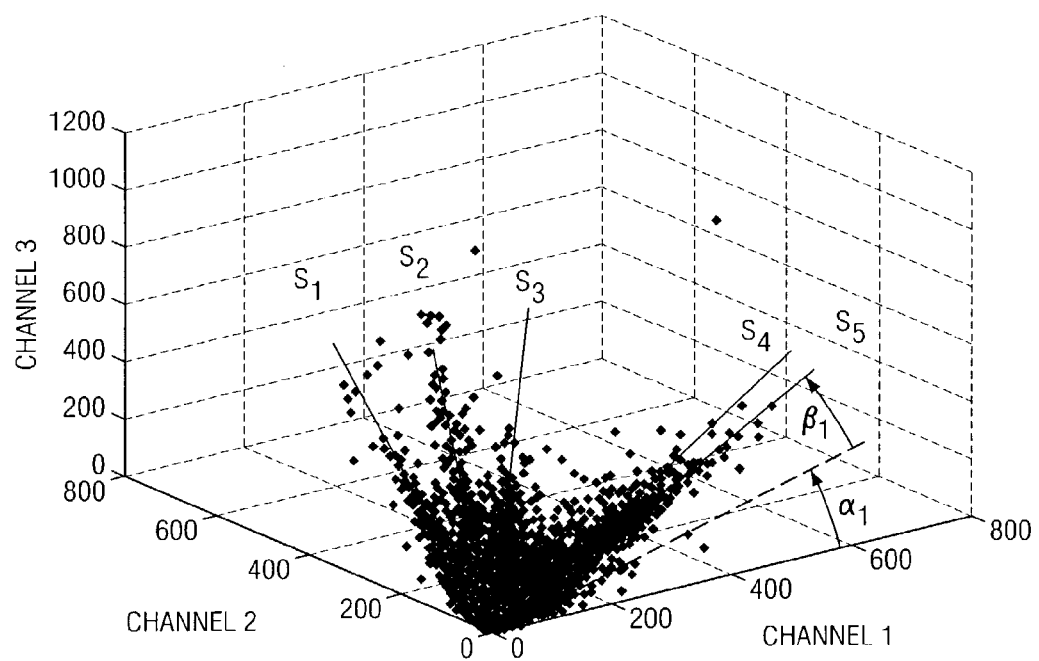
FIG. 3A illustrates an example scatter plot in Cartesian coordinates of a set of example mixture data points representing received mixed signals.

FIG. 3A illustrates a scatter plot in Cartesian coordinates of a set of example mixture data points representing mixed signals received according to the example situation discussed herein (in other words, where N=5 and M=3). This magnitude scatter plot is obtained by plotting the values (in the frequency domain) of one mixture $x_1$ (in other words, the mixed signal received by one of the three antenna elements 16, which may be referred to as Channel 1) versus the frequency domain of the other two mixtures $x_2$ and $x_3$ (in other words, the mixed signals received by the other two antenna elements 16, which may be referred to as Channels 2 and 3). The magnitude vector lines labeled as $s_1$, $s_2$, $s_3$, $s_4$ and $s_5$ represent the actual, or true, source directions associated with the five signal sources 12. These actual source directions are shown for illustrative purposes only, and remain unknown to signal processing system 18.

For a certain portion, or group, of mixture data points, sufficient sparsity (in the transform, or frequency, domain) causes $s_2$, $s_3$, $s_4$ and $s_5$ to equal or approach zero and leaves $s_1$ as the only significant source. As a result, as can be seen in FIG. 3A, this group of data points will significantly cluster around the actual magnitude vector associated with $s_1$ (shown as the left-most line in FIG. 3A). Similarly, for another group of data points, $s_2$ will remain as the only significant source, and such data points will significantly cluster around the magnitude vector associated with $s_2$, and so on for $s_3$, $s_4$ and $s_5$.

Returning to the group of data points in which $s_1$ remains as the only significant source, Equation (4) may be approximated as:

$$\begin{aligned} x_1 e^{jw_{x1}} &= a_{11} s_1 e^{j(w_{11}+w_{s1})} \\ x_2 e^{jw_{x2}} &= a_{21} s_1 e^{j(w_{21}+w_{s1})} \\ x_3 e^{jw_{x3}} &= a_{31} s_1 e^{j(w_{31}+w_{s1})} \end{aligned} \qquad (5)$$

Further, taking the absolute value (in other words, the magnitude) of Equation (5) provides:

$$\begin{bmatrix} |x_1| \\ |x_2| \\ |x_3| \end{bmatrix} = \begin{bmatrix} |a_{11}| \\ |a_{21}| \\ |a_{31}| \end{bmatrix} s_1 \qquad (6)$$

where $|x_1|$, $|x_2|$ and $|x_3|$ are the known magnitudes of each mixture data point, and are equivalent to the product of the unknown magnitude vector $[|a_{11}||a_{21}||a_{31}|]$, of the mixing matrix A times the value of a single source, $s_1$.

Figure 3B:
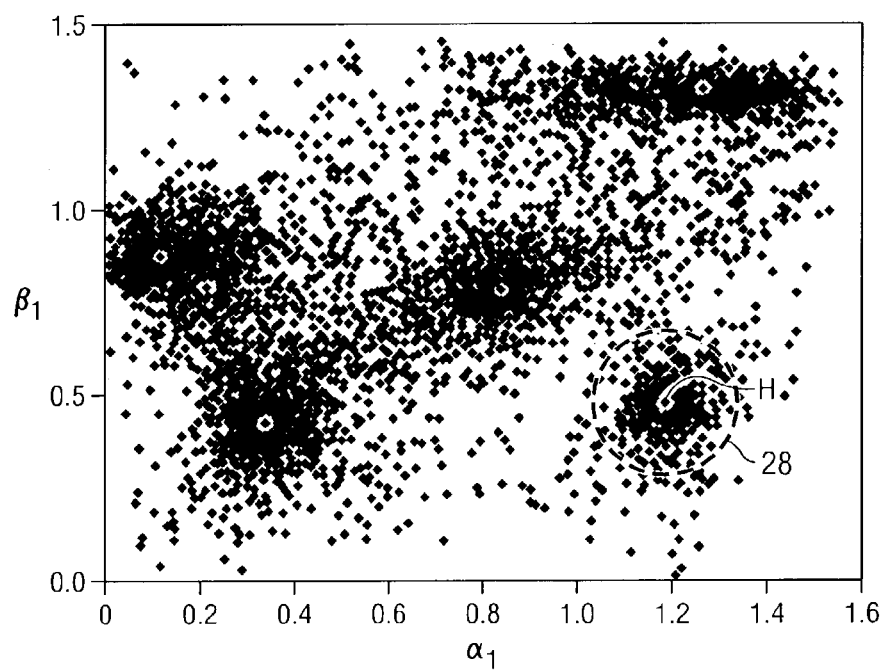
FIG. 3B illustrates the mixture data points of FIG. 3A translated into $\alpha$, $\beta$ Polar coordinates.

As discussed above, each mixture data point in this group of data points substantially clusters around the actual (but unknown) magnitude vector of $s_1$. Similarly, other groups of mixture data points cluster around the actual magnitude vectors of $s_2$, $s_3$, $s_4$ and $s_5$. However, it may be difficult to distinguish two or more of the directions or groups of mixture data points in the Cartesian coordinate system. Thus, at step 62 of the method shown in FIG. 3, the mixture data points may be translated into $\alpha$, $\beta$ Polar coordinates in order to more easily determine, such as by using a data clustering algorithm, the direction of an estimated magnitude vector for each signal source, as discussed below. For example, FIG. 3B illustrates the mixture data points of FIG. 3A in α, β Polar coordinates, which more clearly defines the clustering of the mixture data points around the magnitude vector associated with each source, $s_1$ through $s_5$.

Figure 3C:
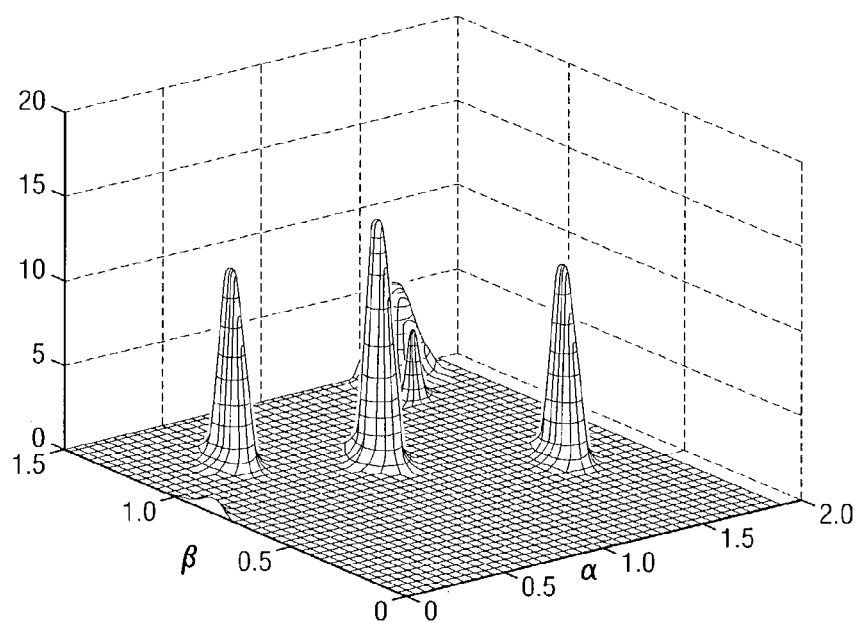
FIG. 3C illustrates the results of a probability density function performed using the mixture data points shown in FIG. 3B.

At step 64, a data clustering algorithm, such as a probability density function (PDF), for example, may then be used to determine the direction of the estimated magnitude vector associated with each source $s_1$ through $s_5$. For example, FIG. 3C illustrates the results of a probability density function (PDF) performed using the mixture data points shown in FIG. 3B. As shown in FIG. 3C, five peaks may be identified from the results of the probability density function. Each of the five peaks corresponds with the estimated magnitude vector associated with one of the five sources $s_1$ through $s_5$. Thus, from each peak, the direction of the five magnitude vectors within mixing matrix A can be determined. For example, from the peak corresponding with the estimated magnitude vector associated with source $s_1$, the direction of the magnitude vector $[|a_{11}| |a_{21}| |a_{31}|]$ in Equation (6) can be determined. The direction of the magnitude vectors associated with each of the other sources $s_2$, $s_3$, $s_4$ and $s_5$ may be similarly estimated. The magnitude, or length, of each magnitude vector remains ambiguous, or unknown. However, the magnitude of each source signal may be adjusted independently as desired without affecting the reconstruction of source signals $s_1$ through $s_5$.

Thus, in this manner, the directions of the magnitude vector associated with each source in mixing matrix A may be estimated. However, in order to fully reconstruct mixing matrix A, the phase angle associated with each source signal must be estimated. The phase angle associated with each source signal is represented by the complex factor in each column of mixing matrix A. For example, the phase angle associated with source signal $s_1$ is represented by ($e^{jw11}$, $e^{jw21}$, $e^{jw31}$) in mixing matrix A.

The phase angle associated with each of the source signals $s_1$ through $s_5$ is estimated at steps 66 through 70, as discussed below. In general, the phase angles associated with each of the source signals are estimated by determining the respective phase difference between the signals received at each antenna element 16.

At step 66, a set of mixed signal data points whose magnitude vector makes a substantially small angle (due to sparsity, for example) with each one of the estimated magnitude vectors of matrix A is determined. Thus, in the example discussed herein, five sets of data points are determined, one corresponding to each source signal. In a particular embodiment, these sets of data points may be determined by determining the data points whose magnitude vector differs in direction from each of the estimated magnitude vectors of matrix A by less than (or less than or equal to) a particular threshold angle. For example, as shown in FIG. 3B, a set of data points corresponding with source signal $s_1$ may include each data point whose magnitude vector differs in direction from the estimated magnitude vector of source signal $s_1$ by less than or equal to a threshold angle, H, illustrated by circle 28.

Figure 3D:
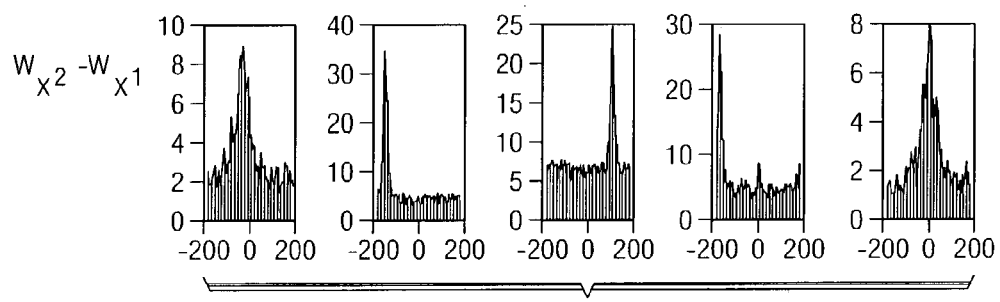
FIG. 3D illustrates an example histogram of the first case of phase-difference for each of five example sources.
Figure 3E:
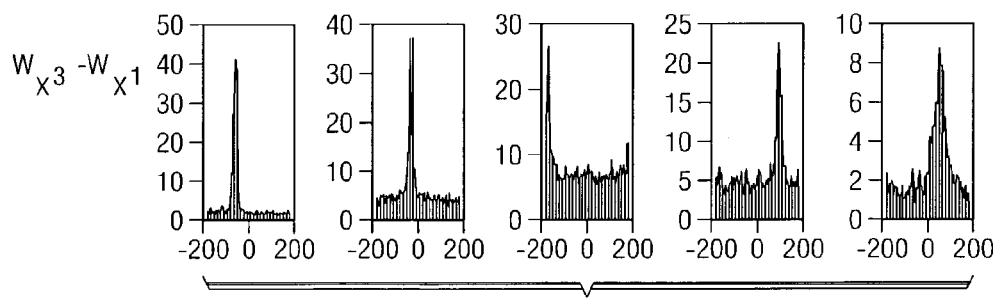
FIG. 3E illustrates an example histogram of the second case of phase-differece for each of five example sources.

At step 68, a phase-difference histogram for each set of data points determined at step 66 is generated. First, it should be noted that although the data points selected at step 66 substantially line up along one of the estimated magnitude vectors, they differ in the value of source signal magnitude, as shown in FIG. 3A. Due to phase ambiguity, a given data point $x^t$ only provides unambiguous information about the differences between the phase values of the complex mixture $x_i$ where $1 < i \leq M$. Thus, there are M−1 (in the present example, two) cases of phase-difference values for a given data point $x^t$. Using the data points determined at step 66, for each of the N (in the present example, five) sets of data points, a uni-modal histogram if generated for each of the M−1 (in the present example, two) cases of phase-difference, as shown in FIGS. 3D and 3E, which are discussed below in greater detail.

For a more complete understanding, each case of phase-difference may be examined more closely. Due to the sparsity assumption discussed above, the phase-difference between the individual rows of Equation (5) can be determined using the following Equations (7a) and (7b), which result in Equations (8a) and (8b) for $s_1$, as follows:

$$X_2 e^{jw_{x2}} / X_1 e^{jw_{x1}} = a_{21} s_1 e^{j(w_{21}+w_{s1})} / a_{11} s_1 e^{j(w_{11}+w_{s1})} \quad (7a)$$

$$X_3 e^{jw_{x3}} / X_1 e^{jw_{x1}} = a_{31} s_1 e^{j(w_{31}+w_{s1})} / a_{11} s_1 e^{j(w_{11}+w_{s1})} \quad (7b)$$

$$w_{x2} - w_{x1} = (w_{21} + w_{s1}) - (w_{11} + w_{s1}) = w_{21} - w_{11} \quad (8a)$$

$$w_{x3} - w_{x1} = (w_{31} + w_{s1}) - (w_{11} + w_{s1}) = w_{31} - w_{11} \quad (8b)$$

where Equation (8a) represents that phase-difference between the first and second rows of Equation (5), and Equation (8b) represents that phase-difference between the second and third rows of Equation (5).

Equations (8a) and (8b) are solved on the right side of each equation for source $s_1$. As such, Equations (8a) and (8b) provide the foundation for computing the two phase-difference histograms for the first source, $s_1$. Equations (8a) and (8b) may be similarly for each of the other sources, $s_2$ through $s_5$ to provide the foundation for computing the two phase-difference histograms for each other source, $s_2$ through $s_5$.

FIG. 3D illustrates an example of the first case of phase-difference ($w_{x2} - w_{x1}$) for each of the five sources, while FIG. 3E illustrates an example of the second case of phase-difference ($w_{x3} - w_{x1}$) for each of the five sources. For example, each histogram shown in FIG. 3D illustrates the result of applying Equation (8a) to the set of data points selected for each source, $s_1$ through $s_5$, at step 66. For each histogram, the x-axis represents the phase-difference, measured from −180 degrees to +180 degrees, and the y-axis represents the frequency or quantity of data points. Similarly, each histogram shown in FIG. 3E illustrates the result of applying Equation (8b) to the set of data points selected for each source, $s_1$ through $s_5$, at step 66.

At step 70, the estimated phase-difference for each magnitude vector is estimated by determining the peak of each histogram shown in FIGS. 3D and 3E. Thus, for example, the estimated phase-differences for the first case of phase-difference ($w_{x2} - w_{x1}$) for each of the five sources, $s_1$ through $s_5$, as shown in FIG. 3D are as follows:

$s_1$: −35.26 degrees;

$s_2$: −146.23 degrees;

$s_3$: +101.21 degrees;

$s_4$: −164.25 degrees; and $s_5$: +2.82 degrees.

Similarly, the estimated phase-differences for the second case of phase-difference ($w_{x3} - w_{x1}$) for each of the five sources, $s_1$ through $s_5$, as shown in FIG. 3E are as follows:

$s_1$: −61.40 degrees;

$s_2$: −37.62 degrees;

$s_3$: −171.18 degrees;

$s_4$: +88.23 degrees; and $s_5$: +50.27 degrees.

At step 72, the complex mixing matrix A may then be estimated based on the magnitude and phase differences estimated as discussed above.

Figure 4A:
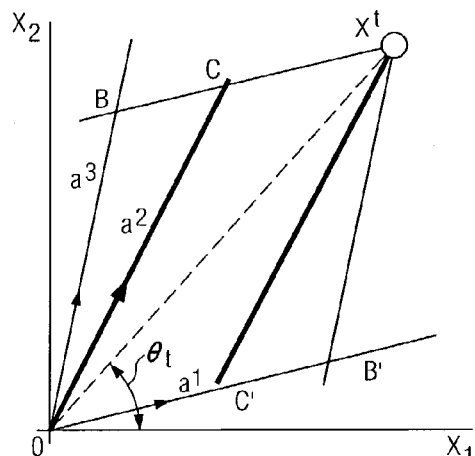
FIG. 4A illustrates a clockwise/counter-clockwise search method for finding a shortest path in a 2-D scenario.
Figure 4B:
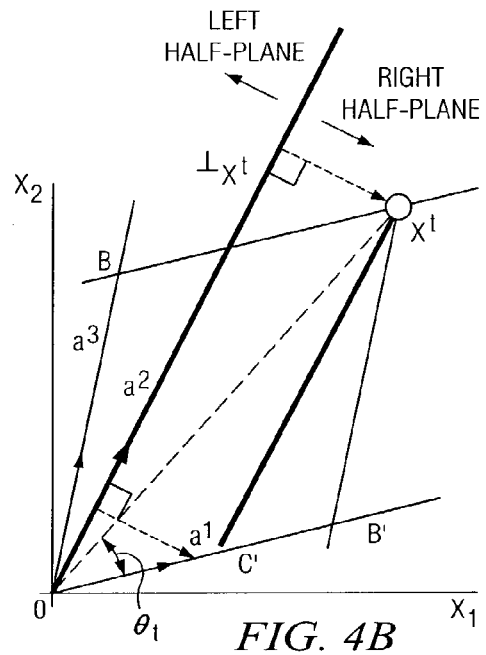
FIG. 4B illustrates a half-plane search method for finding a shortest path in the 2-D scenario of FIG. 4A.

After estimating the complex mixing matrix A as described above with reference to FIG. 3, the source signals may be estimated as described below. Since the system represented by Equation (1) remains underdetermined, its solution is not unique when given the estimated mixing matrix A. The sparse approach to the underdetermined case includes finding the solution that minimizes the $l_1$ norm, as in Equation (3), which yields the maximally sparse decomposition. From the point of view of mixture space, the $l_1$ norm formulation has a geometrical meaning, as shown in FIGS. 4A and 4B, which are discussed below. In other words, the decomposition of a given data point $x^t$ consists of searching a path from the origin "O" to that point $x^t$ constrained by the available directions in the mixing matrix A. The components of $s^t$ are then the lengths of the resulting path along each direction. In this sense, the solution that optimizes sparsity corresponds to the shortest path, and has at most M components different from zero.

To understand the concept of decomposition of a given data point $x^t$ by finding the shortest path from the origin "O" to that point $x^t$, it is helpful to study an example two-dimensional (2-D) scenario (in other words, a scenario in which M=2, recalling that M represents the number of antenna elements 16 in array 14).

FIGS. 4A and 4B illustrate a method of finding the shortest path from the origin "O" to that point $x^t$ in such a 2-D example scenario in which M=2 and N=3. FIG. 4A illustrates a clockwise/counter-clockwise search method for finding the shortest path in a 2-D scenario, while FIG. 4B illustrates a half-plane search method for finding the shortest path in the same 2-D scenario.

As shown in FIG. 4A, axes $x_1$ and $x_2$ represent the magnitude of the signal received by each of the two antenna elements 16, respectively. $x^t$ is the given data point, and a direct line between origin "O" and data point $x^t$ forms an angle $\theta_t$ with the axis $x_1$. Each of $a^1$, $a^2$ and $a^3$ represent one of the three column vectors in [N×M] (or [3×2]) mixing matrix A. The method includes finding the shortest path from "O" to data point $x^t$ along any of the column vectors $a^1$, $a^2$ and $a^3$. In the 2-D case (such as shown in FIG. 4A), the shortest path from "O" to data point $x^t$ is always defined by the two vector directions (in other words, two of the vectors $a^1$, $a^2$ and $a^3$) that enclose $\theta_t$. As shown in FIG. 4A, the shortest path is O-C-$x^t$ (or O-C'-$x^t$), where O-C and C-$x^t$ correspond with $a^2$ and $a^1$, respectively. In other words, data point $x^t$ is "enclosed by" vectors $a^2$ and $a^1$. This result can be obtained using the clockwise/counter-clockwise search method, which consists of searching clockwise from O-$x^t$ until the first vector is found (here, $a^2$) and then searching counter-clockwise from O-$x^t$ until the first vector is found (here, $a^1$).

Then, let $W_r = [a^1 \, a^2]^{-1}$ be the reduced N×N inverse matrix (N=2), and let $s_r^t$ be the reduced decomposition along directions $a^1$ and $a^2$. The components of the sources are then obtained as:

$$s_r^t = W_r x^t \text{ and} \tag{9a}$$

$$s_j^t = 0, \text{ for } j \neq 1, 2. \tag{9b}$$

Before generalizing the 2-D case to higher dimensions, a half-plane enclosing search method, rather than the clockwise/counter-clockwise search method, should be understood for the 2-D case. The 2-D half-plane search method can easily be extended to a half-space search suitable for higher dimension cases (3-D and above), such as in scenarios in which M≧3. As shown in FIG. 4B, the first step of the half-plane search algorithm is to determine the closest vector, or mixing direction to $x^t$, which in this case is vector $a^2$. In one embodiment, the closest vector to $x^t$ is determined by calculting the dot product between $x^t$ and each vector, or mixing direction, $a^j$ (j=1, 2, . . . , n). The closest vector will have the largest dot product, which implies that the angle between that vector and $x^t$ is smaller that the angle between any other vector $a^j$ and $x^t$.

The next step is to establish a line containing $a^2$, which partitions the 2-D plane of FIG. 4B (in other words, the plane of the paper) into two half-planes. The next step is to find the closest vector, or mixing direction, to $x^t$ that resides in the same half-plane as $x^t$, which in this case is $a^1$. As shown in FIG. 4B, $a^3$ resides in the opposite half-plane as $x^t$ and is thus disqualified. To verify that $a^1$ and $x^t$ reside on the same half-plane, the following enclosing condition must be satisfied:

$$(x^t - {}^\perp x^t)'^*(a^1 - {}^\perp a^1) > 0 \tag{10}$$

where ${}^\perp x^t$ denotes the projection of $x^t$ onto $a^2$, and ${}^\perp a^1$ denotes the projection of $a^1$ onto $a^2$.

In this scenario, Equation (10) is satisfied and thus it is verified that $a^1$ and $x^t$ reside on the same half-plane. In this manner, it may be determined that $x^t$ is enclosed most tightly by the two identified vectors, $a^1$ and $a^2$.

To extend this method to the higher dimension M, at each step of finding the next closest mixing direction, the projections discussed above with reference to Equation (10) should be modified. Instead of a projection onto one direction $a^2$, these projections would be done onto the subspace spanned by the set of closest mixing directions identified by all previous steps. This set, which may be called "W," forms a hyper-plane that partitions an M-dimensional space into two half-spaces. It is this matrix W that provides the foundations for the shortest path QR enclosing algorithm that may be used to decompose higher dimensional data points $x^t$, as discussed below with reference to FIGS. 5 and 6.

Figure 5:
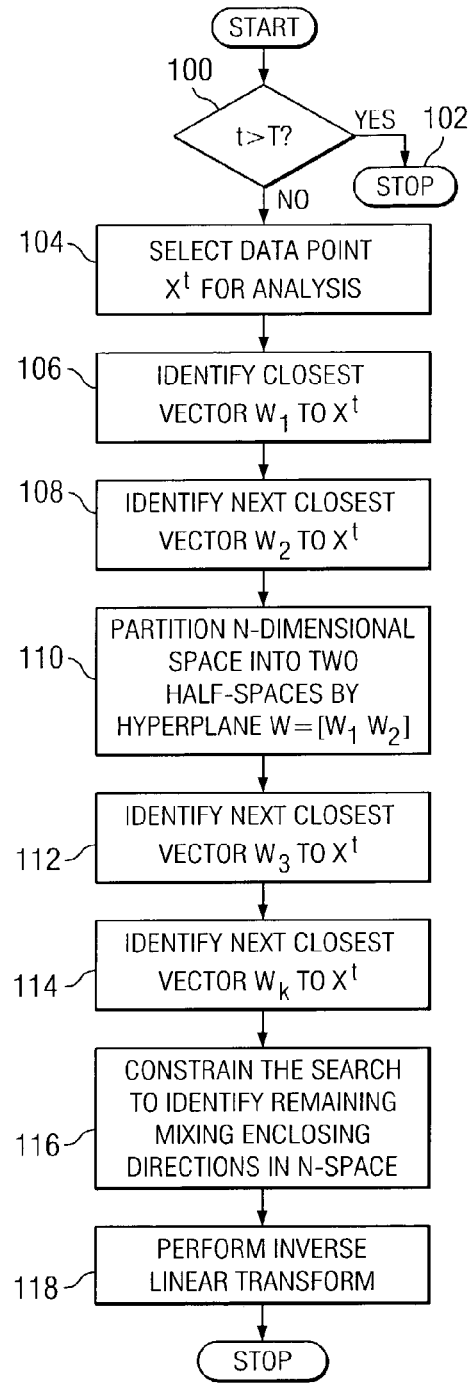
FIG. 5 illustrates an example method of estimating source signals using a shortest path algorithm using QR factorization in a higher-dimensional scenario.
Figure 6:
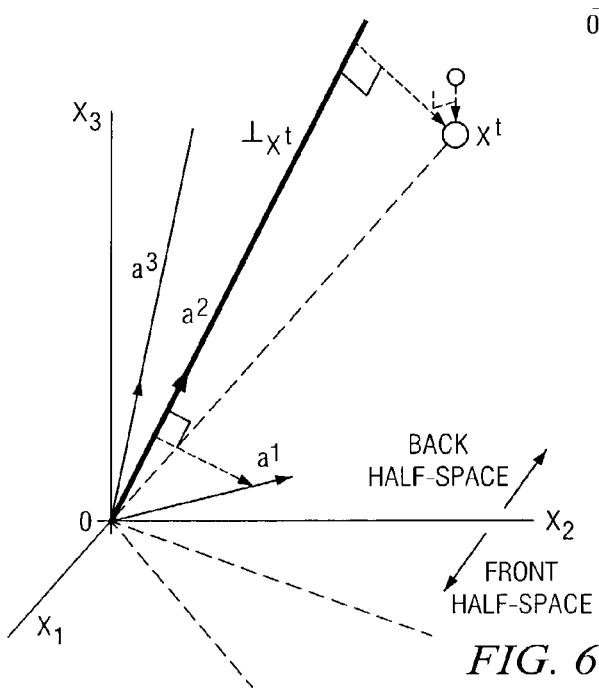
FIG. 6 illustrates an example QR decomposition search of the directions enclosing a given data point in the higher-dimensional scenario shown in FIG. 5.

FIG. 5 is a flowchart illustrating an example method of estimating N source signals for a time duration T using a shortest path algorithm using QR factorization in the M-dimensional case in which M>2. FIG. 5 is best understood in conjunction with FIG. 6. FIG. 6 illustrates an example QR decomposition search of the directions enclosing a given data point, $x^t$, in the M-dimensional case in which M>2.

At step 100, it is determined whether the time of the data point, t, is within the time duration T to be analyzed. If t is not within the duration T, the method stops at step 102. If t is within the duration T, the method continues to step 104. At step 104, a data point $x^t$ is selected for analysis.

At step 106, the QR enclosing algorithm begins by identifying the closest vector, or mixing direction, to $x^t$. In one embodiment, the closest vector to $x^t$ is determined by calculting the dot product between $x^t$ and each vector, or mixing direction, $a^j (j=1, 2, \ldots, n)$. As discussed above, the closest vector will have the largest dot product, which implies that the angle between that vector and $x^t$ is smaller that the angle between any other vector $a^j$ and $x^t$. In the example shown in FIG. 6, the closest vector to $x^t$ is $a^2$. $w_1$ is set equal to the closest vector (here, $a^2$), where $w_1$ is the first column of matrix W which is used in the QR decomposition.

At step 108, the next closest vector from $x^t$ which, when taken with the closest vector (here, $a^2$), encloses $x^t$. In other words, the next closest vector from $x^t$ which satisfies Equation (10) above is determined. In the example shown in FIG. 6, the next closest vector to $x^t$ which satisfies Equation (1) is $a^2$ (in other words, $(x^t - {}^{\perp}x^t)'*(a^1 - {}^{\perp}a^1) > 0$). $w_2$ is set equal to this next-closest vector (here, $a^1$), where $w_2$ is the second column of matrix W.

At step 110, a hyper-plane defined by the $W=[w_1\ w_2]$ is generated that partitions an M-dimensional space into two half-spaces. In the example shown in FIG. 6, the hyper-plane formed by vectors $a^1$ and $a^2$ is coplanar with the plane formed by $X_2$ and $X_3$, and the same half-space (identified in FIG. 6 as the front half-space) contains both $a^3$ and $x^t$. It should be understood that $a^1$ and $a^2$ is coplanar with the plane formed by $X_2$ and $X_3$ in the present example for illustrative purposes only.

At step 112, QR factorization of W is performed to find the next closest vector from $x^t$ which resides in the same half-space as $x^t$. In this example, since $a^3$ and $x^t$ reside in the same half-space (the "front" half-space), $a^3$ is eligible to be identified as the next closest vector. To verify that $a^3$ and $x^t$ reside on the same half-space, Equation (10) must be satisfied, which it is in this example. In other words, in this example, the following equation is satisfied:

$$(x^t - {}^{\perp}x^t)'*(a^3 - {}^{\perp}a^3) > 0 \tag{10a}$$

where ${}^{\perp}x^t$ represents the projection of $x^t$ onto W and ${}^{\perp}a^3$ represents the projection of $a^3$ onto W.

At step 114, QR factorization of w is employed to compute $x^t$ projection onto W in order to extend this enclosing condition to step k, where $k \leq M$, as follows:

$$\text{Let } W = [w_1 \ldots w_{k-1}] = QR, \tag{11}$$

$$\text{then, } {}^{\perp}x^t = Q*(Q'^{*}x^t) \tag{11a}$$

$$^{\perp}a^j = Q*(Q'^{*}a) \tag{11b}$$

where ${}^{\perp}a^j$ represents the projection of $a^j$ onto w, and $w_k = a^j$ is the $k^{th}$ closest vector from $x^t$ such that $$(x^t - {}^{\perp}x^t))'*(a^j - {}^{\perp}a^j) > 0 \tag{10b}$$

At step 116, after QR has been used to constrain the search and find all the minimum enclosing mixing directions in M-dimensional space, the sources may be estimated through the shortest path. At step 118, an inverse linear transform is performed as follows:

Let $W_r = [w_1 \ldots w_M]^{-1}$ be the reduced [M×M] inverse matrix, and let $s_r^t$ be the reduced decomposition along directions $w_1 \ldots w_M$. The components of the sources are then obtained as $$s_r^t = W_r x^t,$$

$$s_j^t = 0, \text{ for } j > M.$$

Although an embodiment of the invention and its advantages are described in detail, a person skilled in the art could make various alterations, additions, and omissions without departing from the spirit and scope of the present invention as defined by the appended claims.

What is claimed is:

1. A method of separating mixed wireless signals, comprising:
   at an antenna comprising a first quantity of antenna elements, receiving mixed signals comprising a mixture of source signals communicated from a second quantity of wireless signal sources; and
   separating the mixed signals to estimate the source signals;
   wherein the second quantity is greater than the first quantity; and
   wherein the source signals communicated from at least one of the wireless signal sources are received at the antenna as complex signals;
   wherein the mixed signals are at partially defined by the source signals multiplied by a mixing matrix; and
   separating the mixed signals to estimate the source signals comprises:
      estimating the spatial directions of the mixing matrix; and
      estimating the source signals based on the estimated spatial directions of the mixing matrix; and
      wherein estimating the source signals comprises executing a shortest path algorithm using QR factorization.

2. The method of claim 1, wherein the mixing matrix comprises complex representations.

3. The method of claim 1, wherein separating the mixed signals to estimate the source signals comprises transforming the mixed signals from the time domain into the frequency domain using a linear transform.

4. The method of claim 3, wherein the linear transform comprises a short-time Fourier transform.

5. The method of claim 1, wherein the source signals communicated from at least one of the wireless signal sources are received at the antenna as complex signals due to multi-path effects.

6. A method of separating mixed wireless signals, comprising:
   at an antenna comprising a first quantity of antenna elements receiving mixed signals comprising a mixture of source signals communicated from a second quantity of wireless signal sources;
   separating the mixed signals to estimate the source signals;
   wherein the second quantity is greater than the first quantity;
   wherein the source signals communicated from at least one of the wireless signal sources are received at the antenna as complex signals;
   wherein the mixed signals are at partially defined by the source signals multiplied by a mixing matrix;
   separating the mixed signals to estimate the source signals comprises:
      estimating the spatial directions of the mixing matrix; and
      estimating the source signals based on the estimated spatial directions of the mixing matrix;
      wherein estimating the mixing matrix comprises estimating a plurality of source signal magnitude vectors based on clustering of data points of source signals received at the antenna; and wherein estimating the mixing matrix further comprises executing a phase-difference algorithm to estimate one or more phase-differences for each source signal.

7. A system for separating mixed wireless signals, comprising:
- an antenna comprising a first quantity of antenna elements, each antenna element operable to receive mixed signals comprising a mixture of source signals communicated from a second quantity of wireless signal sources;
- a signal processing system operable to separate the mixed signals to estimate the source signals;
- wherein the second quantity is greater than the first quantity;
- wherein the source signals communicated from at least one of the wireless signal sources are received at the antenna as complex signals;
- wherein the mixed signals are at partially defined by the source signals multiplied by a mixing matrix; and
- wherein the signal processing system comprises:
  - a mixing matrix estimation module operable to estimate the spatial directions of the mixing matrix; and
  - a signal extraction module operable to estimate the source signals based on the estimated spatial directions of the mixing matrix; and
  - wherein estimating the source signals comprises executing a shortest path algorithm using OR factorization.

8. The system of claim 7, wherein the mixing matrix comprises complex representations.

9. The system of claim 7, wherein the signal processing system comprises:
- a linear transform module operable to transform the mixed signals from the time domain into the frequency domain using a linear transform; and
- an inverse linear transform module operable to transform the mixed signals from the frequency domain back to the time domain using an inverse linear transform.

10. The system of claim 9, wherein the linear transform comprises a short-time Fourier transform.

11. A system for separating mixed wireless signals, comprising:
- an antenna comprising a first quantity of antenna elements, each antenna element operable to receive mixed signals comprising a mixture of source signals communicated from a second quantity of wireless signal sources;
- a signal processing system operable to separate the mixed signals to estimate the source signals;
- wherein the second quantity is greater than the first quantity;
- wherein the source signals communicated from at least one of the wireless signal sources are received at the antenna as complex signals;
- wherein the mixed signals are at partially defined by the source signals multiplied by a mixing matrix; and
- wherein the signal processing system comprises:
  - a mixing matrix estimation module operable to estimate the spatial directions of the mixing matrix; and
  - a signal extraction module operable to estimate the source signals based on the estimated spatial directions of the mixing matrix;
  - wherein estimating the mixing matrix comprises estimating a plurality of source signal magnitude vectors based on clustering of data points of source signals received at the antenna; and
  - wherein estimating the mixing matrix further comprises executing a phase-difference algorithm to estimate one or more phase-differences for each source signal.

* * * * *